United States Patent
Liu et al.

(10) Patent No.: US 11,681,709 B2
(45) Date of Patent: Jun. 20, 2023

(54) JOINING REMOTE TABLES BY A FEDERATED SERVER

(71) Applicant: INTERNATIONAL BUSINESS MACHINES CORPORATION, Armonk, NY (US)

(72) Inventors: Chang Sheng Liu, Beijing (CN); Ya Qiong Liu, Beijing (CN); Lei Cui, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/172,704

(22) Filed: Feb. 10, 2021

(65) Prior Publication Data
US 2022/0253440 A1  Aug. 11, 2022

(51) Int. Cl.
| | |
|---|---|
| G06F 16/00 | (2019.01) |
| G06F 16/2455 | (2019.01) |
| G06F 16/2453 | (2019.01) |
| G06F 16/242 | (2019.01) |
| G06F 16/248 | (2019.01) |
| G06F 16/25 | (2019.01) |

(52) U.S. Cl.
CPC .... G06F 16/2456 (2019.01); G06F 16/24544 (2019.01); *G06F 16/248* (2019.01); *G06F 16/2435* (2019.01); *G06F 16/24552* (2019.01); *G06F 16/256* (2019.01)

(58) Field of Classification Search
CPC .......... G06F 16/2456; G06F 16/24552; G06F 16/24544; G06F 16/256; G06F 16/2435; G06F 16/248; G06F 11/3409

USPC .................................................. 707/600–899
See application file for complete search history.

(56) References Cited

U.S. PATENT DOCUMENTS

| | | | |
|---|---|---|---|
| 5,903,893 A | 5/1999 | Kleewein et al. | |
| 7,711,692 B2 * | 5/2010 | Froehlich .......... | G06F 16/24535 707/718 |
| 7,720,838 B1 | 5/2010 | Li et al. | |
| 8,122,008 B2 | 12/2012 | Li et al. | |
| 2011/0119251 A1 * | 5/2011 | Yu ....................... | H04L 67/1097 707/719 |
| 2011/0302151 A1 * | 12/2011 | Abadi ................. | G06F 16/2456 707/E17.017 |

(Continued)

OTHER PUBLICATIONS

Anonymous, "Method and Apparatus for optimizing operation across heterogeneous databases", ip.com, Jul. 29, 2008, 9 pages.

(Continued)

*Primary Examiner* — Michelle N Owyang
(74) *Attorney, Agent, or Firm* — Rakesh Roy; Andrew D. Wright; Calderon, Safran & Cole, P.C.

(57) ABSTRACT

A system and method of joining remote tables by a federated server is provided. A method includes receiving a data join request from a client device; sending a first block fetch request to a first data source based on the data join request; receiving a first set of block data from the first data source; sending a second block fetch request to a second data source based on the data join request and a bind array containing the data of join column in the first data source; receiving a second set of block data from the second data source; and sending an output to the client device in response to the data join request in the form of rows from an outer table and an inner table.

18 Claims, 13 Drawing Sheets

(56) References Cited

U.S. PATENT DOCUMENTS

2017/0322974 A1* 11/2017 Hoffmann ......... G06F 16/24535
2021/0026847 A1*  1/2021 Ahmed .............. G06F 16/2393
2021/0034625 A1*  2/2021 Shah .................. G06F 16/9024
2022/0012223 A1*  1/2022 Brockington-Hill .......................
                                                 G06F 16/278

OTHER PUBLICATIONS

Anonymous, "High performance joining method using federated database and trigger function", ip.com, Oct. 14, 2005, 5 pages.
Anonymous, "Block-Based Join Algorithms", https://mariadb.com/kb/en/block-based-join-algorithms/, Sep. 29, 2020, 3 pages.
Mell et al., "The NIST Definition of Cloud Computing", NIST, Special Publication 800-145, Sep. 2011, 7 pages.

* cited by examiner

Exemplary Scenarios

406A
T1 (col1_1 int, col2_1 int)

| col1_1 | col2_1 |
|--------|--------|
| 1      | 11     |
| 2      | 22     |
| 3      | 33     |

406B
T2 (col1_2 int, col2_2 int)

| col1_2 | col2_2 |
|--------|--------|
| 1      | 101    |
| 1      | 111    |
| 3      | 333    |
| 4      | 444    |

1st Client Request: SELECT col2_2 FROM T1, T2 WHERE col1_1=col1_2

Data Retrieved

Col2_2
-----------
101
111
333
-----------
3 rows

T2 request: SELECT col2_2 FROM T2 WHERE col1_2 = :H0

1) Only columns in T2 selected (only inner columns)
2) Bind array of col1_1 fetched from T1
3) No additional process required for block-based NLJ

2nd Client Request: SELECT col1_1, col2_1, col2_2 FROM T1, T2 WHERE col1_1=col1_2

Data Expected

| Col1_1 | col2_1 | Col2_2 |
|--------|--------|--------|
| 1      | 11     | 101    |
| 1      | 11     | 111    |
| 3      | 33     | 333    |

3 rows

Actual Data Returned

| Col1_1 | col2_1 | Col2_2 |
|--------|--------|--------|
| 3      | 33     | 101    |
| 3      | 33     | 111    |
| 3      | 33     | 333    |

3 rows

1) Both columns in T1 and T2 selected
2) Bind array of col1_1 fetched from T1
3) Additional process required for block-based NLJ (match T1 rows kept)
4) Join pipeline does NOT work (fake match)

FIG. 8

Exemplary Fetch Scenario

406A → T1 (col1_1 int, col2_1 int)

| col1_1 | col2_1 |
|---|---|
| 1 | 11 |
| 2 | 22 |
| 3 | 33 |

406B → T2 (col1_2 int, col2_2 int)

| col1_2 | col2_2 |
|---|---|
| 1 | 101 |
| 1 | 111 |
| 3 | 333 |
| 4 | 444 |

*Client request: SELECT col1_1, col2_1, col2_2 FROM T1, T2 WHERE col1_1=col1_2*

```
                    Col1_1      col2_1      Col2_2
                    ------------------------------------
Results From T1=      1           11          101
                      1           11          111
                      3           33          333
                    ------------------------------------
                                              3 rows
```

Column size ≤ threshold value

<u>Utilize Column Injector:</u>
*T2 request: SELECT :H0, :H1, col2_2 FROM T2 WHERE col1_2 = :H0*

Column size > threshold value

<u>Utilize Tuple Producer:</u>
*T2 request: SELECT col1_2, col2_2 FROM T2 WHERE col1_2 = :H0*

FIG. 9

JOINING REMOTE TABLES BY A FEDERATED SERVER

BACKGROUND

Aspects of the present invention relate generally to database management systems and, more particularly, to joining tables in multiple heterogeneous distributed databases by a federated data server.

In general, a federated database system is a type of database management system which maps multiple autonomous database systems into a single federated database. Today, federated system technology enables unified access to any digital information, in any format (structured and unstructured) in any information store. When a federated database system needs to access multiple tables in different remote data sources, a standard nested loop join (NLJN) is often chosen to join tables from the different remote data sources. An NLJN is an algorithm that reads rows from a first table of data in a loop, one at a time, passing each row to a nested loop that processes the next table in the join. This process is repeated as many times as there remain tables to be joined.

SUMMARY

In a first aspect of the invention, there is a computer-implemented method including: sending, by a federated server, a first block fetch request to a first data source based on a data join request of a client; receiving, by the federated server, a first set of block data from the first data source, wherein the first set of block data comprises multiple rows of an outer table in the first data source; sending, by the federated server, a second block fetch request to a second data source based on the data join request, the second block fetch request including the first set of block data as a bind array; receiving, by the federated server, a second set of block data from the second data source, the second set of block data comprising multiple rows of an inner table in the second data source; and sending, by the federated server, an output to the client in response to the data join request.

In another aspect of the invention, there is a computer program product including one or more computer readable storage media having program instructions collectively stored on the one or more computer readable storage media. The program instructions are executable to cause a federated server to: receive a data join request from a client device, the data join request including data from an outer table in a first data source and data from an inner table in a second data source; send a first block fetch request specifying a block size of data to the first data source based on the data join request; receive a first set of block data from the first data source in response to the first block fetch request, wherein the first set of block data comprises multiple rows of the outer table in the first data source and is less than or equal to the block size specified in the first block fetch request; save the first set of block data in a temporary storage area of the federated server; send a second block fetch request to the second data source based on the data join request, the second block fetch request including the first set of block data as a bind array; receive a second set of block data from the second data source in response to the second block fetch request, the second set of block data comprising multiple rows of the inner table in the second data source; and send an output to the client device in response to the data join request in the form of rows from the outer table and the inner table.

In another aspect of the invention, there is system including a processor, a computer readable memory, one or more computer readable storage media, and program instructions collectively stored on the one or more computer readable storage media. The program instructions are executable to cause a federated server to: receive a data join request from a client device, the data join request including data from an outer table in a first data source and data from an inner table in a second data source, wherein the first data source and the second data source comprise heterogeneous distributed databases; send a first block fetch request specifying a block size of data to the first data source based on the data join request; receive a first set of block data from the first data source in response to the first block fetch request, wherein the first set of block data comprises multiple rows of the outer table in the first data source and is less than or equal to the block size of data specified in the first block fetch request; save the first set of block data in a temporary storage area of the federated server; send a second block fetch request to the second data source based on the data join request, the second block fetch request including the first set of block data as a bind array; receive a second set of block data from the second data source in response to the second block fetch request, the second set of block data comprising multiple rows of the inner table in the second data source; and send an output to the client device in response to the data join request in the form of rows from the outer table and the inner table.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 8 illustrates certain technical challenges that may arise in implementations of bulk NLJN method of joining data.

FIG. 9 illustrates exemplary sub steps of a bulk NLJN method of joining data in accordance with aspects of the invention.

DETAILED DESCRIPTION

Figure 1:
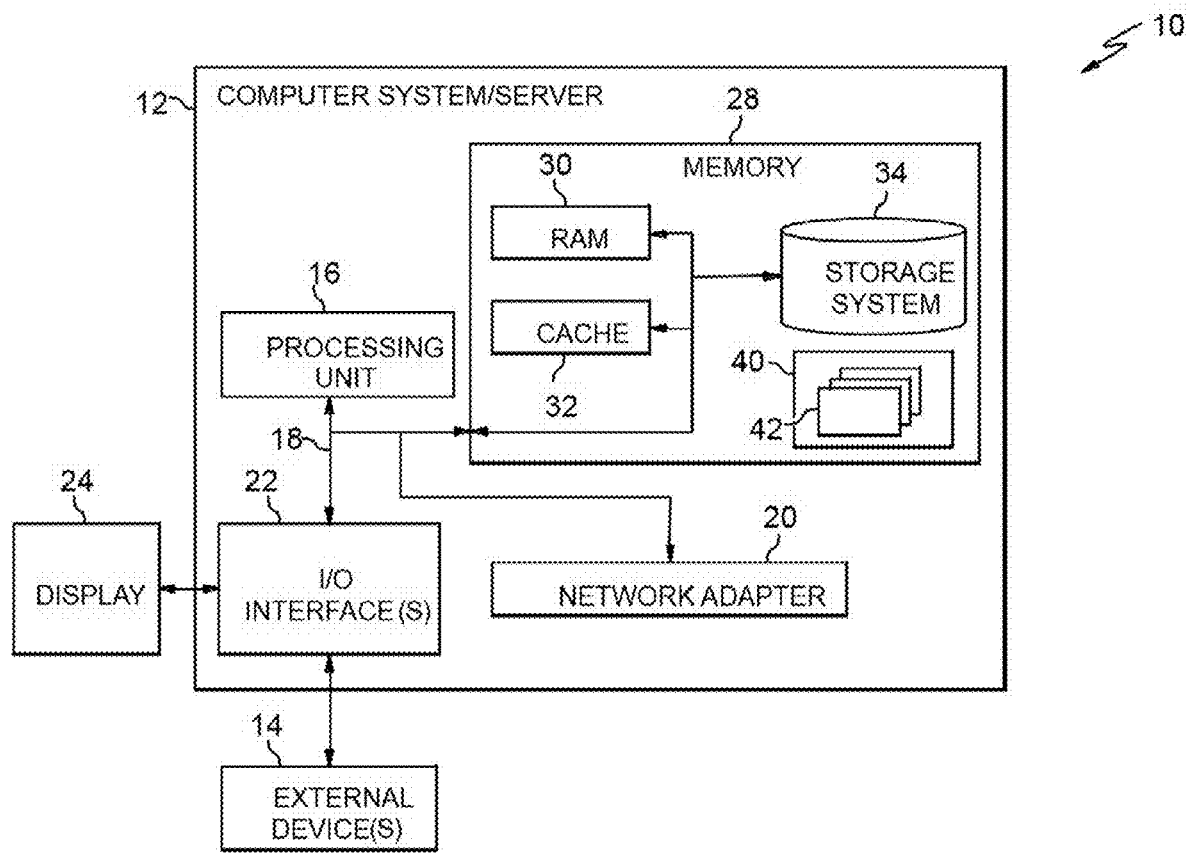
FIG. 1 depicts a cloud computing node according to an embodiment of the present invention.

Aspects of the present invention relate generally to database management systems and, more particularly, to joining tables in multiple heterogeneous distributed databases by a federated data server. In embodiments, in response to receiving a data retrieval request from a client device, an improved nested loop join (NLJN) method is utilized by a federated server to join data from heterogeneous distributed databases. The improved NLJN process is referred to as bulk NLJN herein.

In implementations, a federated server receives a join request from a client device, which requires the federated server to join data from at least two tables. A "join" operation as discussed herein is the process of matching rows from a first table (e.g., outer table) with rows from a second table (e.g., inner table) using a qualified columns' values. In aspects, a federated server, utilizing bulk NLJN, leverages block fetch methods to faster access an outer table to feed data efficiently to the federated server as blocks of data. The bulk NLJN further utilizes an array bind to reduce the round-trip time required by the federated server to fetch data from an inner table. In aspects, when there are columns from an outer table (other than the join column from the outer table) included in a join query, and the size of data of the columns is not that large (e.g., at or below a predetermined threshold size value), a column injector of the federated server modifies a remote Structured Query Language (SQL) request to access the inner table by injecting columns from an outer table in the select list of the SQL. The term SQL as used herein refers to a domain-specific language designed to manage data held in a relational database management system. If the size of the data of the columns in the original join query select list from the outer table exceeds a predetermined threshold size value, a tuple producer of the federated server constructs tuples of final match data by partial hash joining rows of the outer table with rows of the inner table.

Federated servers may utilize a NLJN process wherein, for every row of an outer table at a first remote data source, an inner table scan of a second remote data source is invoked. In general, each invocation of NLJN process at a federated server may include the steps of: sending an SQL request for data to a first data source based on a fetch request received from a client; obtaining rows of data of a first data table (outer table) from the first data source; sending an SQL request for data to a second data source, wherein for each row of data of the first data table, the second data source looks for rows in a second data table (inner table) that have values matching the values of the first data table; and obtaining rows of data of the second data table from the second data source. Such a NLJN process requires a federated server to send a request to the inner table for each invocation, and receive results data from the inner table. Such a method is expensive from an operational standpoint (e.g., requires significant time and computing resources).

Bulk NLJN according to embodiments of the invention provides a technical solution to the technical problem presented by NLJN processes, by providing faster access to an outer table through a block fetch process, and reducing the number of round-trip data fetching required from inner tables by utilizing an array bind process. Embodiments of the invention provide for a more computationally-efficient retrieval of data from different remote data sources compared to other NLJN processes, and improve the performance of table joining operations of a federated server without shipping the table row data directly between data sources (data-ship-join), and without producing a temporary merged table comprising merging rows of the inner and outer tables.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
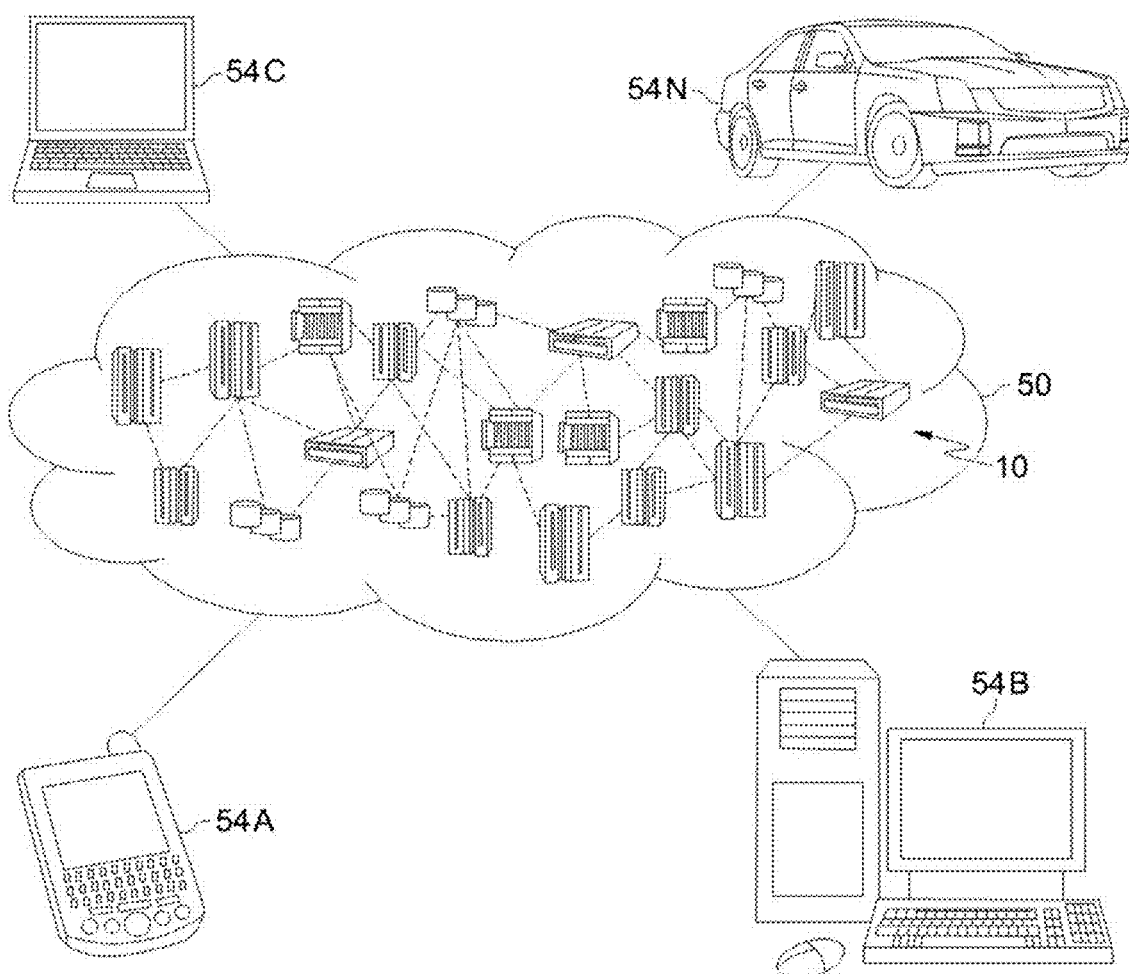
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
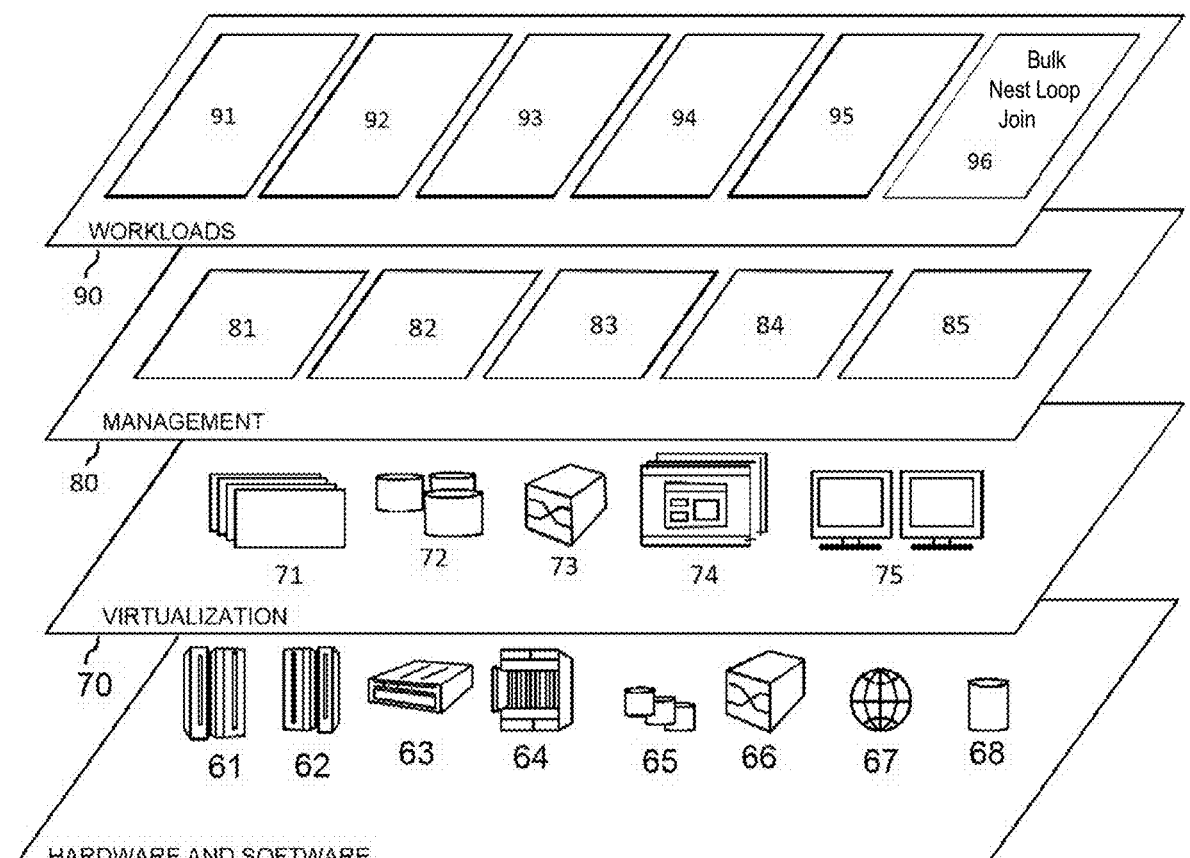
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and bulk nest loop join (NLJN) processing 96.

Implementations of the invention may include a computer system/server 12 of FIG. 1 in which one or more of the program modules 42 are configured to perform (or cause the computer system/server 12 to perform) one of more functions of the bulk NLJN processing 96 of FIG. 3. For example, the one or more of the program modules 42 may be configured to: send a first block fetch request, specifying a block size of data, to the first data source based on the data join request; receive a first set of block data from the first data source in response to the block fetch request, wherein the first set of block data comprises multiple rows of the outer table in the first data source and is less than or equal to the block size of data specified in the block fetch request; save the first set of block data in a temporary storage area of the federated server; send a second block fetch request, with a bind array comprising multiple rows of the outer table in the first data source, to the second data source based on the data join request, the second block fetch request including the first set of block data as the bind array; receive a second set of block data from the second data source in response to the second block fetch request, the second set of block data comprising multiple rows of the inner table in the second data source; and send an output to the client device in response to the data join request in the form of rows from the outer table and the inner table.

Figure 4:
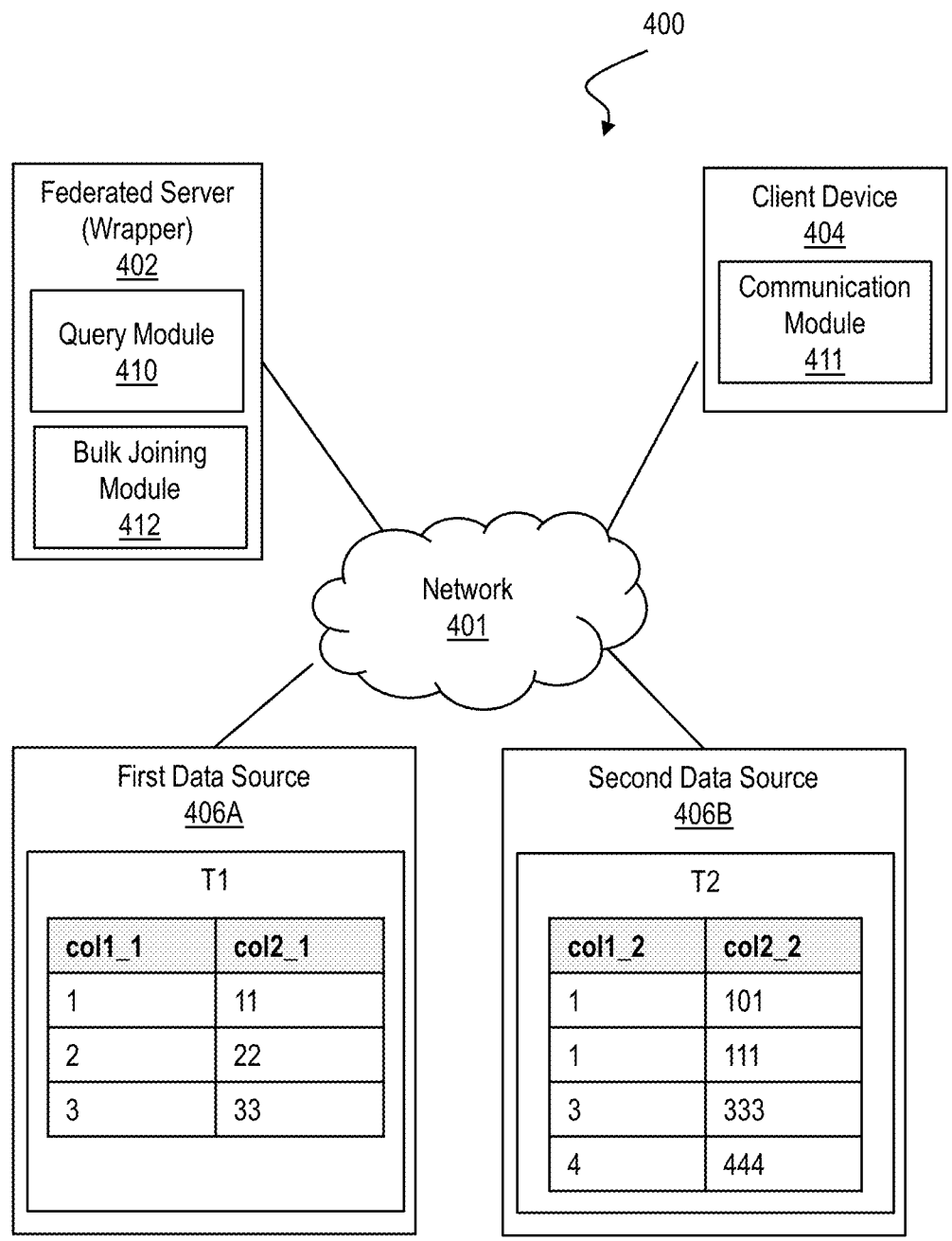
FIG. 4 shows a block diagram of an exemplary environment in accordance with aspects of the invention.

FIG. 4 shows a block diagram of an exemplary environment in accordance with aspects of the invention. In embodiments, the environment 400 includes network 401 interconnecting a federated server 402 with one or more client devices 404, and a plurality of data sources represented by the first data source 406A and the second data source 406B. Although only two data sources are shown, it should be understood that federated server 402 may be in communication with any number of data sources via the network 401.

The network 401 may be any suitable communication network or combination of networks, such as a local area network (LAN), a general wide area network (WAN), and/or a public network (e.g., the Internet). In embodiments, the federated server 402, the one or more client devices 404, and the first and second data sources 406A, 406B, comprise nodes 10 in the cloud computing environment 50 of FIG. 2. In implementations, the federated server 402 provides cloud-based services to one or more clients in the environment 400 via the network 401.

In implementations, the federated server 402 includes one or more components of the computer system 12 of FIG. 1 and is configured to obtain data from one or more data sources (e.g., 406A, 406B) based on requests received from one or more client devices 404. In embodiments, the federated server 402 is a special purpose computing device providing data retrieval services for clients of the network 401. The federated server 402 may include one or more program modules (e.g., program module 42 of FIG. 1) executed by the federated server 402 and configured to perform one or more functions described herein.

In embodiments, the federated server 402 includes one or more of the following program modules (e.g., program modules 42 of FIG. 1): a query module 410 configured to communicate with a communication module 411 of a client device 404 and one or more data sources (e.g., 406A, 406B), and a bulk joining module 412 configured to obtain and join data as required in response to client data requests from the one or more client devices 404. Join methods utilized by the federated server 402 may comprise merged join, nested loop join, or other methods. The term "join" as used herein refers to a process for combining columns from one or more tables using values common to each. As used herein, the term "outer table" refers to a table driving a join operation (i.e., the table whose rows are first accessed by a database application in a NLJN process). The term "inner table" as used herein refers to a table from which data is further retrieved by the database application (e.g., bulk joining module 412) after data has been retrieved from the outer table.

In embodiments, the one or more data sources 406A, 406B each include one or more components of the computer system 12 of FIG. 1, and are each configured to store data in respective first and second data tables T1 and T2. In implementations, the first table T1 is an outer table and the second data table T2 is an inner table.

The one or more client devices 404 may comprise one or more computing devices (e.g., a personal digital assistant or cellular telephone 54A, desktop computer 54B, laptop computer 54C, etc. of FIG. 2) configured to communicate with and received data from the federated server 402, wherein each client device 404 includes components of the computer system 12 of FIG. 1. A communication module 411 of the client device 404 may comprise one or more program modules 42 of FIG. 1, and is configured to send data requests (e.g., SQL join requests) of a user from the client device 404 to the federated server 402 (e.g., to the query module 410), for processing.

In embodiments, separate modules described above may be integrated into a single module. Additionally, or alternatively, a single module described above may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5:
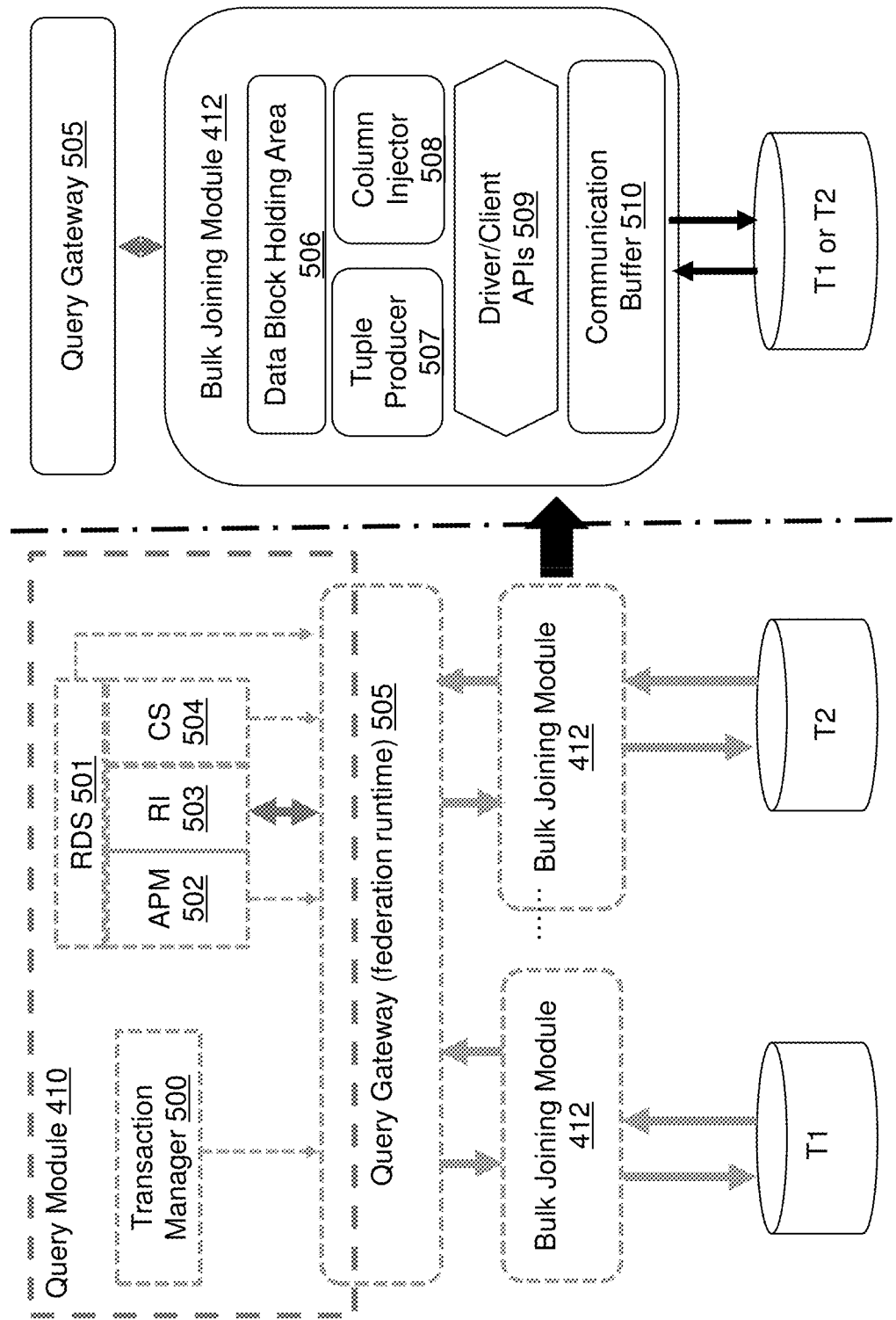
FIG. 5 illustrates exemplary architecture of a federated server system in accordance with aspects of the invention.

FIG. 5 illustrates exemplary architecture of a federated server 402 in accordance with aspects of the invention. The architecture of FIG. 5 may be implemented in the federated server 402 of FIG. 4, and is described with reference to elements depicted in FIG. 4.

In implementations, the query module 410 of the federated server 402 includes a transaction manager 500 configured to manage data retrieval transactions between the federated server 402 and multiple client devices 404. In aspects, the query module 410 includes a relational data service (RDS) 501 comprising an access plan manager (APM) 502, a runtime interpreter (RI) unit 503, and a catalog service (CS) unit 504. The query module 410 communicates with the bulk join module 412 via a query gateway 505. In the embodiment shown, the bulk join module 412 is in communication with first and second tables T1 and T2.

With continued reference to FIG. 5, in implementations, the bulk join module 412 includes a data block holding area 506, a tuple producer 507, a column injector 508, driver/client APIs 509, and a communication buffer 510. Each of the data block holding area 506, tuple producer 507, column injector 508, driver/client application program interfaces (APIs) 509, and communication buffer 510 may comprise one or more of the program modules (e.g., program modules 42 of FIG. 1). In implementations, the data block holding area 506 is configured to temporarily hold blocks of data received from an outer table during a bulk NLJN process of the invention. In aspects, the tuple producer 507 is configured to produce tuples to finalize results of a bulk NLJN process of the invention. In embodiments, the column injector 508 is configured to inject columns into a data request to an inner table during a bulk NLJN process of the invention. The driver/client APIs 509 may be configured to enable the federated server 402 to access features or data of an operating system, application or other service. In aspects of the invention, the communication buffer 510 is provided to temporarily store or buffer incoming data (e.g., from tables T1 or T2).

Figure 6:
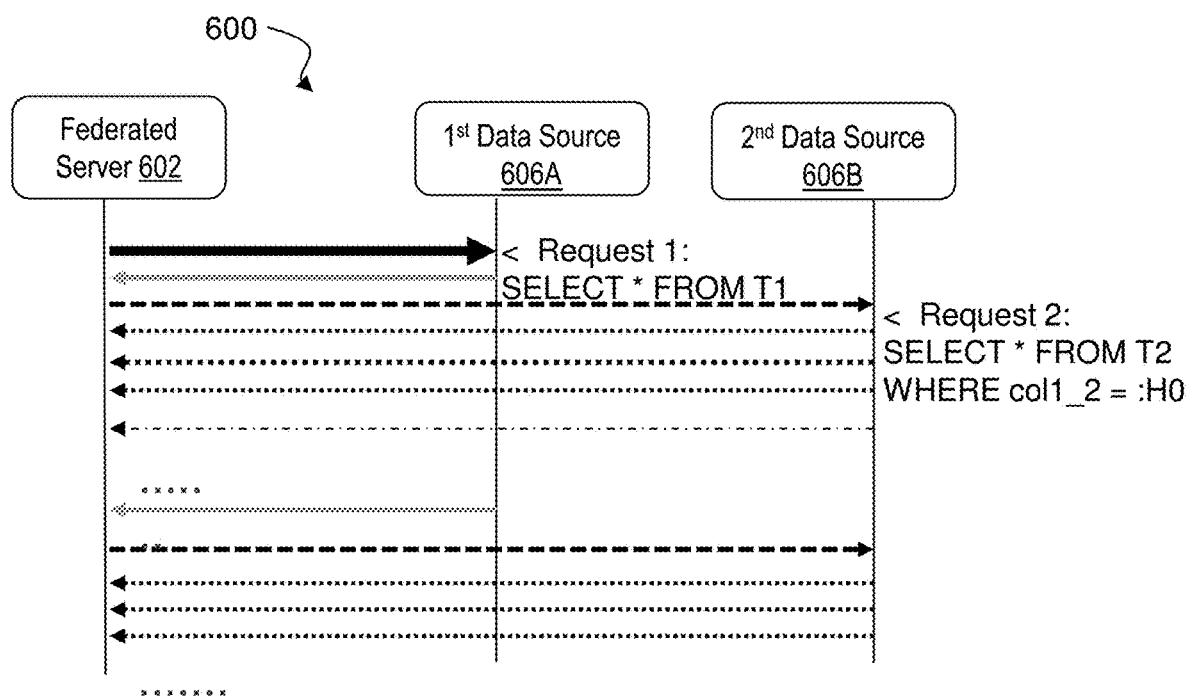
FIG. 6 illustrates an exemplary NLJN row by row method of joining data from two remote tables.

FIG. 6 illustrates an exemplary NLJN row-by-row method 600 of joining data from two remote tables. For the federated NLJN scenario of FIG. 6, each row of an outer table (T1) in a first data source 606A invokes a scan of an inner table (T2) of data source 606B (remote from data source 606A), and each invocation involves sending a request to the data source 606B, fetching one or more rows in the inner table T2, and receiving the result data in response to the request. Such an operation may utilize a lot of resources, and may be expensive from an operational point of view.

In the example of FIG. 6, a client request in FIG. 6 is shown as "SELECT*FROM T1, T2 WHERE col1_1=col1_2." Note that "*" is a wildcard, and using it in the select list "SELECT*FROM T1" is equivalent to says "bring me all the columns that are visible in the table T1." In this example, tables T1 and T2 each include a first column (col1) and a second column (col2), and the request indicates that values in column 1 from table T1 (col1_1) are equal to values in column 1 of table T2 (col1_2). In this example, the federated server 602 sends a structured query language (SQL) request to the first data source 606A in the form of "SELECT*FROM T1", and obtains data from the first data source 606A in the form of rows of data from table T1. The federated server 402 then sends an SQL request to the second data source 606B in the form of "SELECT*FROM T2 WHERE col1_2=:H0" where :H0 is replaced by a value of col1_1(col1 in table T1) bound before executing. In this case, a data manager (not shown) of the data source 606B determines if values of column col1_1 in the rows of data from table T1 match values of column col1_2 in one or more rows of data in table T2, and returns the matches in the form of rows of data from the table T2 to the federated server 602. This process is performed for each row of data from table T1.

Figure 7:
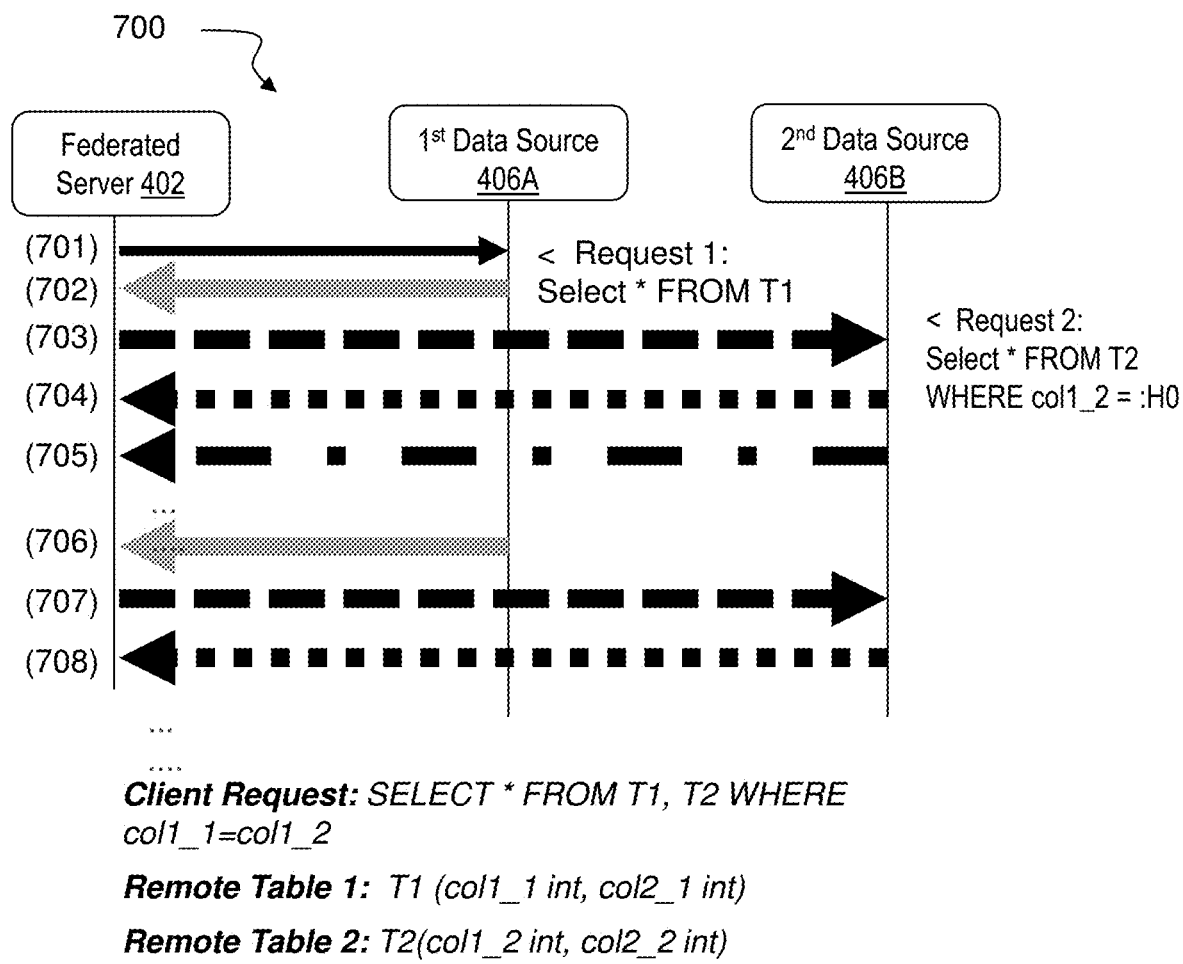
FIG. 7 illustrates an exemplary bulk NLJN method of joining data from two remote tables in accordance with aspects of the invention.

FIG. 7 illustrates an overview of an exemplary bulk NLJN method 700 of joining data from two remote tables in accordance with aspects of the invention. Methods of FIG. 7 may be performed in the environment 400 of FIG. 4, and are described with reference to elements depicted in FIG. 4.

In the example of FIG. 7, the federated server 402 initially receives an SQL request for data to join two remote tables in the form of "SELECT*FROM T1, T2 WHERE col1_1=col1_2." At 701, the federated server 402 sends an SQL block fetch request to the first data source 406A, requesting data from the table T1 in response to receiving the request for data. In this example, the SQL block fetch request is in the form of "SELECT*FROM T1."

At 702, the federated server 402 receives block data from the first data source 406A in response to the request of 701. In this example, the block data is in the form of a number of rows from T1.

At 703, the federated server 402 sends an SQL block fetch request and bind array (a set of data values of column col1_1 from table T1, as part of the block fetch result sent to the first data source 406A) to the remote data source 406B. In this example, the request is in the form of: SELECT col1_2, col2_2 FROM T2 WHERE col1_2=:H0, wherein H0 is the host variable, and is replaced with the bind array (a set of data values of column col1_1 from table T1) during execution time.

At 704, the federated server 402 receives block data from the remote data source 406B in response to the request of 703. In this example, the block data is in the form of one or more rows from T2.

At 705, the federated server 402 sends an additional fetch request to the remote data source 406B, and receives additional block data in response to the additional fetch request from the remote data source 406B.

At 706, the federated server 402 sends a new fetch request to the second data source 406A, and the process of 701-705 is repeated. Advantageously, bulk NLJN is block-based, and the use of block fetch results in a faster data retrieval process over the process of FIG. 6. Moreover, the use of an array bind reduces the number of round-trips needed to retrieve requested data, improving the inner table data retrieval process over that of FIG. 6. Additionally, the bulk NLJN method of FIG. 7 improves the performance of table join operations for different remote data sources without the need to ship the table row data directly between data sources (e.g., data-ship-join operations).

FIG. 8 illustrates certain technical challenges that may arise in implementations of bulk NLJN method of joining data in accordance with aspects of the invention. In the example of FIG. 8, a first client request is in the form of "SELECT col2_2 FROM T1, T2, WHERE col1_1=col1_2." In this scenario, outer table T1 comprises column 1 (col1_1) and column 2 (col2_1), and inner table T2 includes column 1 (col1_2) and column 2 (col2_2). The client requests data from a column of T2 only (e.g., "SELECT col2_2 . . ."). In accordance with this first example, the federated server (e.g., 402) sends a request to outer table T1 for data of column col1_1. The federated server (e.g., 402) then sends a request to inner table T2 (e.g., "SELECT col2_2 FROM T2 WHERE col1_2=:H0"). The results obtained by the federated server are complete since col2_2 is all the data required by the join query, and no additional process is required for block-based NLJN (i.e., the data retrieved accurately reflects the data from the table T2 in this case).

With continued reference to FIG. 8, a second client request is in the form of "SELECT col1_1, col2_2 FROM T1, T2 WHERE col1_1=col1_2." Like in the first scenario, outer table T1 comprises column 1 (col1_1) and column 2 (col2_1), and inner table T2 includes column 1 (col1_2) and column 2 (col2_2). The second client request requires data from T1 ("SELECT col1_1 . . .") and T2 ("SELECT . . . col2_2 . . ."). In accordance with this second example, the federated server 402 sends a request to outer table T1 for data of column col1_1. In this case, without any additional modification to the data request, the data retrieved by the federated server 402 does not include all of the data available. In this case, for a row-based pipeline method, the default result is concatenated with the data of col1_1 and col1_2 in the current accessed row in T1 (usually pointed by the cursor position) and data of columns fetched from T2, shown as the actual data returned, the data of columns in the current row in T1 is (3, 33), and part of the concatenated result is not valid, like (3, 33, 101) and (3, 33, 111), because the data of column col1_2 where data of column col2_2 equals to 101 or 111 is 1 instead of 3, so the matches returned is fake. For a block-based pipeline method, the match information is actually lost, i.e., the federated server 402 informs the second data source 406B to return a set of rows in T2 where column col1_2 equals any of the value in the bind array (a set of values of column col1_1 in T1), but for each row returned from T2, a user cannot be sure which exact row in T1 the returned T2 rows match. Even follow the row-based method, the final result is still not correct. Therefore, an additional process is required for block-based NLJN (to match T1 rows kept).

FIG. 9 illustrates exemplary sub steps of a bulk NLJN method of joining data in accordance with aspects of the invention. The sub steps of FIG. 9 may be performed in the environment 400 of FIG. 4, and are described with reference to elements depicted in FIG. 4 and FIG. 5. In order to address the second scenario of FIG. 8, wherein a block request with a bind array, without more, does not result in retrieval of all data requested, embodiments of the invention select between two sub steps. Like in the examples of FIG. 8, FIG. 9 depicts an outer table T1 including column 1 (col1_1) and column 2 (col2_1), and an inner table T2 including column 1 (col1_2) and column 2 (col2_2). In a first scenario, a client request for data is in the form of "SELECT col_1, col2_1, col2_2 FROM T1, T2 WHERE col1_1=col1_2." In this first example, the client requests data from both columns from T1 ("SELECT col1_1, col2_1 . . .") and column 2 from T2 ("SELECT . . . col2_2 . . ."). In order to obtain all requested data utilizing a block fetch with a bind array approach, the federated server 402 determines whether to perform a first sub step utilizing a column injector 508, or a second sub step utilizing a tuple producer 507.

With continued reference to FIG. 9, in a first scenario, after sending a data request to the outer table T1 and obtaining data for the outer table T1, the federated server 402 determines that the size of columns from the outer table T1 is less than or equal to a predetermined threshold value. In this case, the federated server 402 initiates the column injector 508 to inject columns from the outer table T1 into an SQL data request to the inner table T2. That is, instead of the request to T2 being based only on the client request ("SELECT col_1, col2_1, col2_2 FROM T1, T2 WHERE col1_1=col1_2"), the request to T2 is a modified request including additional data injected by the column injector 508. In this example, the modified request to T2 is in the form of a block request with a bind array "SELECT:H0, :H1, col2_2 FROM T2 WHERE col1_2=:H2", wherein the additional data is ":H0, :H1". The data received by the federated server 402 from the inner table T2 (in response to the modified request) is complete, and no additional steps are needed to fetch all of the data requested by the client. Additional details regarding bulk NLJN utilizing the column injector 508 are described below with reference to FIG. 11.

With continued reference to FIG. 9, in a second scenario, after sending a data request to the outer table T1 and obtaining data for the outer table T1, the federated server 402 determines that the size of columns from the outer table T1 is greater than a predetermined threshold value. In this case, column injection would result in a relatively high amount of data (greater than the predetermined threshold value) being sent to the second data source 406B and transferred back to federated server 402, leading to significant network traffic. Accordingly, to avoid the significant network traffic, the federated server 402 initiates the tuple producer 507 instead of the column injector 508. Upon initiation, the tuple producer 507 builds rows of data in buckets in the data block holding area 506 of the federated server 402, and sends a block request for data with a bind array to the inner table T2, in the form of "SELECT col1_2, col2_2 FROM T2 WHERE col1_2=:H0." After receiving data from the inner table T2 in response to the request, the tuple producer 507 initiates a partial join (hash join) to product tuples as partial rows of bulk NLJN output. Additional details regarding bulk NLJN utilizing the tuple producer 507 are described below with reference to FIG. 12.

Figure 10:
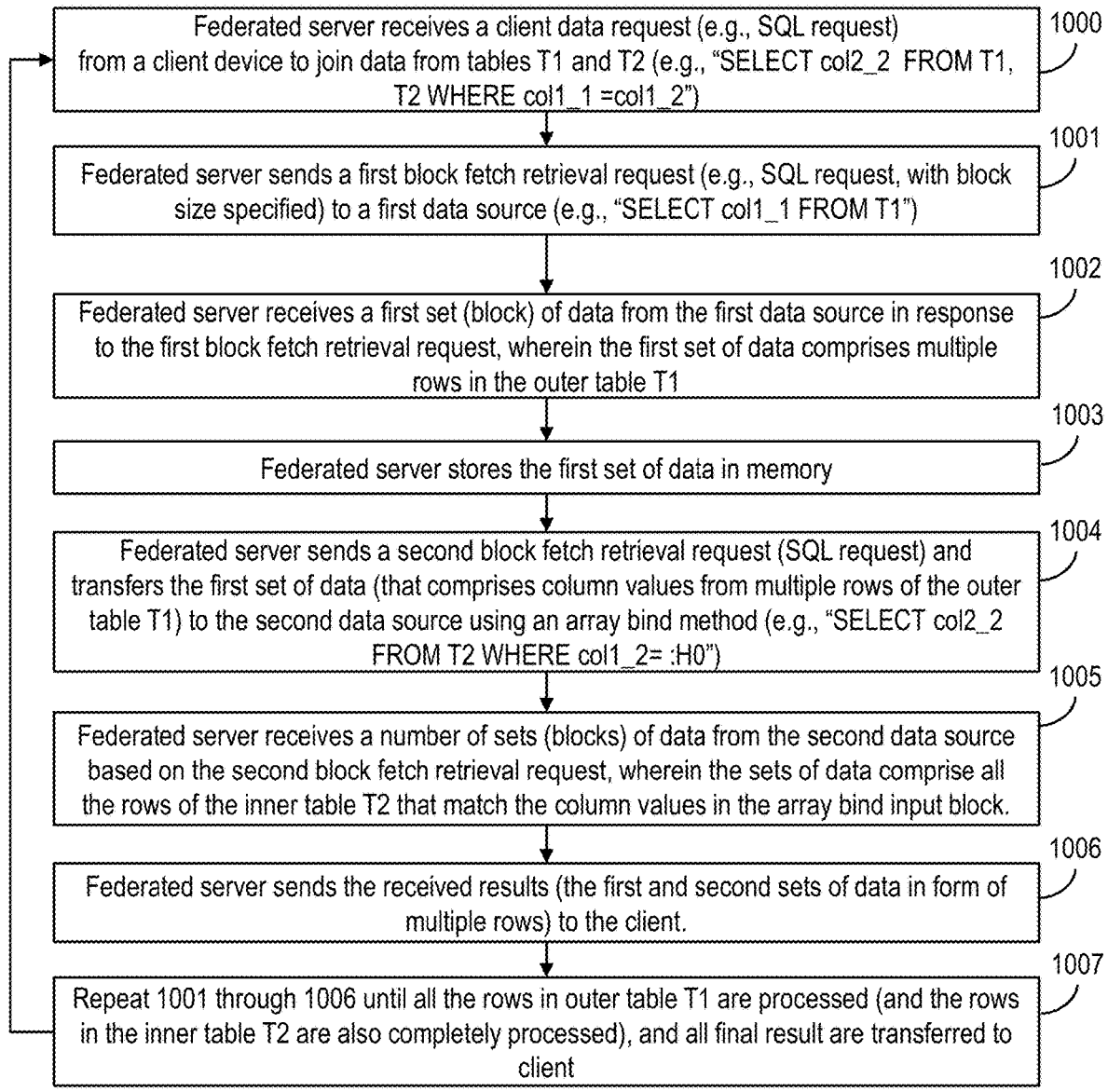
FIG. 10 shows a flowchart of a first exemplary method in accordance with aspects of the invention.

FIG. 10 shows a flowchart of a first exemplary method in accordance with aspects of the invention. The steps of FIG. 10 may be implemented in the federated server 402 of FIG. 4, and are described with reference to elements depicted in FIG. 4. The first exemplary method of FIG. 10 is performed when a client data retrieval request specifies data to retrieve from an inner table (e.g., T2) only (e.g., when only the join column from an inner table is included in a client data retrieval request or client join query).

At 1000, the federated server 402 receives a client data request (e.g., data join request) from the client device 404. Such join requests require the federated server 402 to retrieve data from tables in at least two different remote heterogeneous databases (data sources). In embodiments, the client data request is in the form of an SQL request to join data from tables T1 and T2. As an example, the client data request may be in the form of a statement: "SELECT col2_2 FROM T1, T2, WHERE col1_1=col1_2". In this example, the statement indicates the client intends to retrieve data from column 2 in inner table T2, and the retrieved data should match the condition of: data from column 1 in outer table T1 matching data from column 1 in table T2. In implementations, the query module 410 of the federated server 402 receives the data retrieval request at step 1000.

At step 1001, the federated server 402 sends a first block fetch retrieval request (e.g., an SQL request) to the outer table T1 based on the client data request received at step 1000, with a block size specified. More specifically, the federated server 402 determines data to fetch from table T1 based on the client data request, generates a first block fetch retrieval request, and sends the first block fetch retrieval request to the first data source 406A housing the outer table T1. In embodiments, the federated server 402 divides the received client data request (e.g., join SQL query statement) into two sub-statements, each of which depicts the operation to be performed on respective remote databases (e.g., first data source 406A and second data source 406B). As an example, for the client data request statement: "SELECT col2_2 FROM T1, T2, WHERE col1_1=col1_2," the federated server 402 may generate a sub-statement for the inner table T1 in the form of: "SELECT col1_1 FROM T1", and may generate another sub-statement for the outer table T2 in the form of "SELECT col2_2 FROM T2." In embodiments, the federated server 402 determines where the requested data (e.g., data from inner table T1) is stored (e.g., the first data source 406A) before generating the first block fetch retrieval request based on, for example, stored information regarding data sources in the network 401. In aspects, the first block fetch retrieval request is in the form of an SQL sub-statement. In implementations, the bulk join module 412 implements step 1001.

At step 1002, the federated server 402 receives a first set or block of data (with a size less than or equal to the specified block size) from the first data source 406A in response to the block fetch retrieval request of step 1001. In implementations, the first data source 406A queries the outer table T1 according to the received block fetch retrieval request (e.g., first SQL sub-statement), and returns rows of matching data to the federated server 402 at step 1002 as the retrieval result (e.g., rows of specific data from T1, column 1). In implementations, the bulk join module 412 implements step 1002.

At step 1003, the federated server 402 stores the first set of data received at step 1002 in the data block holding area 506. In implementations, the data block holding area 506 is a data buffer configured to temporarily store data blocks during join request processing. Unlike other types of joining processing, the bulk NLJN utilized by the federated server 402 does not generate a temporary table using data received at step 1002. Instead, the data received at step 402 is buffered during the join request processing. In implementations, the bulk join module 412 implements step 1002.

At step 1004, the federated server 402 sends a second block fetch request (e.g., an SQL request) to the second data source 406B based on the client data request received at step 1000, wherein the second block fetch request includes the first set of block data or input block (comprising column values from multiple rows of the outer table T1) as a bind array. More specifically, the federated server 402 determines data to fetch from table T2 based on the client data request, generates a second block fetch retrieval request, and sends the second block fetch retrieval request to the second data source 406B housing the inner table T2, along with the data fetched from the outer table T1 at step 1002 as the bind array. In aspects, the second block fetch retrieval request is in the form of an SQL sub-statement. In one example, the second block fetch request is in the form of a sub-statement for the outer table T2 of: "SELECT col2_2 FROM T2 WHERE col1_2=:H0", wherein H0 is an array bind binding the first data block as host variables to the inner table T2. In embodiments, the federated server 402 determines where the requested data (e.g., data from outer table T2) is stored (e.g., the second data source 406B) before generating the second block fetch retrieval request based on, for example, stored information regarding data sources in a network. In implementations, the bulk join module 412 implements step 1004.

At step 1005, the federated server 402 receives a number of sets (blocks) of data from the second data source 406B in response to the second block fetch retrieval request of step 1004, wherein the sets of data comprise all of the rows of the inner table T2 that match the column values in the array bind (e.g., H0). In implementations, the first data source 406A queries the inner table T2 according to the received second block fetch retrieval request (e.g., second SQL sub-statement), and returns rows of matching data to the federated server 402 at step 1005 as the retrieval result (e.g., rows of specific data from T2, column 2). The sets of data received at step 1005 may be stored in the data block holding area 506 of the federated server 402. In implementations, the bulk join module 412 implements step 1005.

At step 1006, the federated server 402 returns the received first and second sets of data to the client (e.g., client device 404) as a final result, in response to the block fetch retrieval request received at step 1001. In embodiments, the final result is in the form of multiple rows of data from the respective outer and inner tables T1 and T2, which the federated server 402 retrieves from the data block holding area 506.

At step 1007, the federated server 402 may repeat steps 1001 through 1006 as necessary to retrieve all data requested in the client data request. The number of iterations may differ based on the block size array (e.g., how much data can be fetched at a time), and the amount of data to be retrieved.

Figure 11:
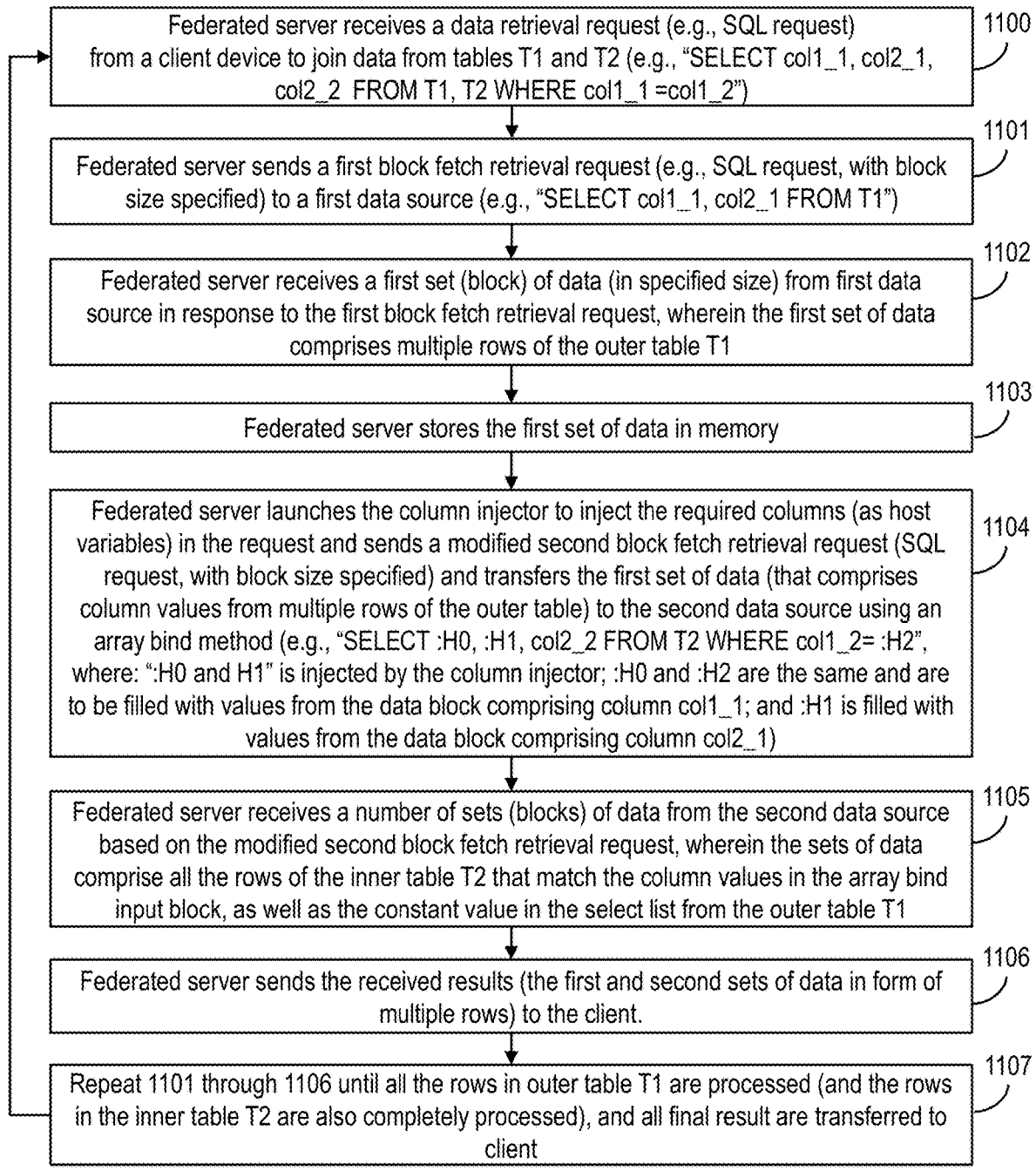
FIG. 11 shows a flowchart of a second exemplary method in accordance with aspects of the invention.

FIG. 11 shows a flowchart of a second exemplary method in accordance with aspects of the invention. The steps of FIG. 11 may be implemented in the federated server 402 of FIG. 4, and are described with reference to elements depicted in FIG. 4. The second exemplary method of FIG. 11 is performed when a client data retrieval request specifies data to retrieve from an inner table and an outer table (e.g., T1 and T2), and the data size of columns from an outer table (e.g., T1) is less than or equal to a predetermined threshold value.

At 1100, the federated server 402 receives a client data request (e.g., join request) from the client device 404. In embodiments, the client data request is in the form of an SQL request to join data from tables T1 and T2. As an example, the client data request may be in the form of a statement: "SELECT col1_1, col2_1, col2_2 FROM T1, T2 WHERE col1_1=col1_2". In this example, the statement indicates the client intends to retrieve data from column 1 in table T1, column 2 in table T1, and column 2 in table T2, and the retrieved data should match the condition of: data from column 1 in table T1 matching data from column 1 in table T2. In implementations, the query module 410 of the federated server 402 receives the data retrieval request at step 1100.

At step 1101, the federated server 402 sends a first block fetch retrieval request (e.g., an SQL request) specifying a block size to the outer table T1 based on the client data request received at step 1100. In aspects, the federated server 402 generates the first block fetch retrieval request in the same manner discussed above with respect to FIG. 10, step 1001. As an example, for the client data request statement: "SELECT col1_1, col2_1, col2_2 FROM T1, T2 WHERE col1_1=col1_2," the federated server 402 may generate a sub-statement for the inner table T1 in the form of: "SELECT col1_1, col2_1 FROM T1", wherein the first block fetch retrieval request is in the form of the sub-statement. In implementations, the bulk join module 412 implements step 1101.

At step 1102, the federated server 402 receives a first set or block of data (within the size limit specified in the first block fetch retrieval request) from the first data source 406A in response to the first block fetch retrieval request of step 1101. In implementations, the first data source 406A queries the outer table T1 according to the received first block fetch retrieval request (e.g., first SQL sub-statement), and returns rows of matching data to the federated server 402 at step 1102 as the retrieval result (e.g., rows of specific data from T1, column 1). In implementations, the bulk join module 412 implements step 1102.

At step 1103, the federated server 402 stores the first set of data received at step 1102 in the data block holding area 506 (e.g., data buffer). In implementations, the bulk join module 412 implements step 1003.

At step 1104, the federated server 402 launches/initiates the column injector 508 in accordance with predetermined rules to generate and send a modified second block fetch retrieval request to the second data source 406B. In embodiments, when federated server 402 determines that a data size of T1 columns received at step 1102 is less than or equal to a predetermined threshold value, the federated server 402 initiates the column injector 508 to generate the modified second block fetch retrieval request (e.g., SQL request). Upon initiation, the column injector 508 injects the required columns (as host variables) in a block fetch request (e.g., an SQL request) as a bind array to the second data source 406B based on the client data request received at step 1100, wherein the modified second block fetch request includes the first set of block data (comprising column values from multiple rows of the outer table T1). More specifically, the federated server 402 determines data to fetch from table T2 based on the client data request, generates a modified second block fetch retrieval request with a bind array, and sends the modified block fetch retrieval request to the second data source 406B housing the inner table T2, along with the data fetched from the outer table T1 at step 1102 as the bind array. In aspects, the block fetch retrieval request is in the form of an SQL sub-statement with additional data injected by the column injector 508.

In one example, the modified second block fetch request to the second data source 406B is in the form of a modified sub-statement for the outer table T2 of: "SELECT:H0, :H1, col2_2 FROM T2 WHERE col1_2=:H2", where: the term ":H0 and H1" is injected by the column injector; "H0" and "H2" are the same and are to be filled with values from the data block comprising column col1_1; and "H1" is filled with values from the data block comprising column col2_1. In embodiments, the federated server 402 determines where the requested data (e.g., data from outer table T2) is stored (e.g., the second data source 406B) before generating the modified second block fetch retrieval request based on, for example, stored information regarding data sources in a network. In implementations, the bulk join module 412 implements step 1104.

At step 1105, the federated server 402 receives a number of sets (blocks) of data from the second data source 406B in response to the modified second block fetch retrieval request of step 1104, wherein the sets of data comprise all of the rows of the inner table T2 that match the column values in the array bind input block (input data retried from T1), as well as the constant value in the select list from the outer table T1. In implementations, the first data source 406A queries the inner table T2 according to the received modified second block fetch retrieval request (e.g., modified SQL sub-statement), and returns rows of matching data to the federated server 402 at step 1105 as the retrieval result. The sets of data received at step 1105 may be stored in the data block holding area 506 of the federated server 402. In implementations, the bulk join module 412 implements step 1105.

At step 1106, the federated server 402 returns the received first and second sets of data to the client (e.g., client device 404) as a final result, in response to the modified second block fetch retrieval request received at step 1001. In embodiments, the final result is in the form of multiple rows of data from the respective outer and inner tables T1 and T2, which the federated server 402 retrieves from the data block holding area 506.

At step 1107, the federated server 402 may repeat steps 1101 through 1106 as necessary to retrieve all data requested in the client data request. The number of iterations may differ based on the block size array (e.g., how much data can be fetched at a time), and the amount of data to be retrieved.

Figure 12:
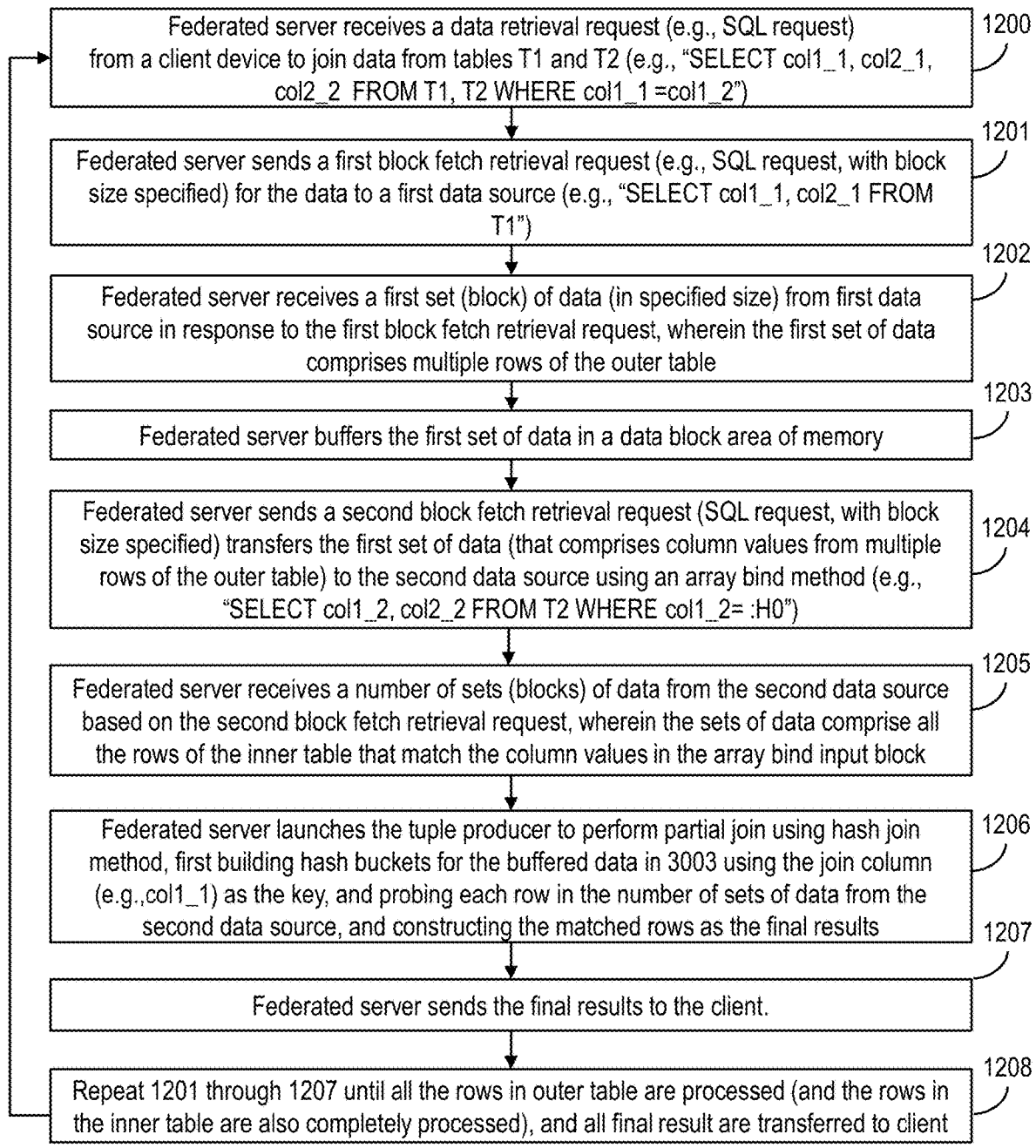
FIG. 12 shows a flowchart of a third exemplary method in accordance with aspects of the invention.

FIG. 12 shows a flowchart of a third exemplary method in accordance with aspects of the invention. The steps of FIG. 12 may be implemented in the federated server 402 of FIG. 4, and are described with reference to elements depicted in FIG. 4. The third exemplary method of FIG. 12 is performed when a client data retrieval request specifies data to retrieve from an inner table and an outer table (e.g., T1 and T2), and the size of columns from an outer table (e.g., T1) is greater than a predetermined threshold value.

At 1200, the federated server 402 receives a client data retrieval request (e.g., join request) from the client device 404. In embodiments, the client data request is in the form of an SQL request to join data from tables T1 and T2. As an example, the client data request may be in the form of a statement: "SELECT col1_1, col2_1, col2_2 FROM T1, T2 WHERE col1_1=col1_2". In this example, the statement indicates the client intends to retrieve data from column 1 in table T1, column 2 in table T1, and column 2 in table T2, and the retrieved data should match the condition of data from column 1 in table T1 matching data from column 1 in table T2. In implementations, the query module 410 of the federated server 402 receives the data retrieval request at step 1200.

At step 1201, the federated server 402 sends a first block fetch retrieval request (e.g., an SQL request) specifying a block data size to the outer table T1 based on the client data request received at step 1200. In aspects, the federated server 402 generates the block fetch retrieval request in the same manner discussed above with respect to FIG. 10, step 1201. As an example, for the client data request statement: "SELECT col1_1, col2_1, col2_2 FROM T1, T2 WHERE col1_1=col1_2," the federated server 402 may generate a sub-statement for the inner table T1 in the form of: "SELECT col1_1, col2_1 FROM T1", wherein the first block fetch retrieval request is in the form of the sub-statement. In implementations, the bulk join module 412 implements step 1201.

At step 1202, the federated server 402 receives a first set or block of data (within the block size limit specified) from the first data source 406A in response to the first block fetch retrieval request of step 1201. In implementations, the first data source 406A queries the outer table T1 according to the received first block fetch retrieval request (e.g., first SQL sub-statement), and returns rows of matching data to the federated server 402 at step 1202 as the retrieval result (e.g., rows of specific data from T1, column 1). In implementations, the bulk join module 412 implements step 1202.

At step 1203, the federated server 402 stores the first set of data received at step 1202 in the data block holding area 506 (e.g., data buffer). In implementations, the bulk join module 412 implements step 1203.

At step 1204, the federated server 402 sends a second block fetch request (e.g., an SQL request) with a bind array (specifying an upper size limit of the data block) to the second data source 406B based on the client data request received at step 1200, wherein the second block fetch request includes the first set of block data (comprising column values from multiple rows of the outer table T1) as an array bind input block. The federated server 402 may determine data to fetch in the same manner discussed above with respect to Table 10, step 1004. In one example, the second block fetch request is in the form of a sub-statement for the outer table T2 of: "SELECT col1_2, col2_2 FROM T2 WHERE col1_2=:H0", wherein H0 is an array bind binding the first data block as host variables to the inner table T2. In embodiments, the federated server 402 determines where the requested data (e.g., data from outer table T2) is stored (e.g., the second data source 406B) before generating the second block fetch retrieval request based on, for example, stored information regarding data sources in a network. In implementations, the bulk join module 412 implements step 1204.

At step 1205, the federated server 402 receives a number of sets (blocks) of data from the second data source 406B in response to the second block fetch retrieval request of step 1204, wherein the sets of data comprise all of the rows of the inner table T2 that match the column values in the array bind input block. In implementations, the first data source 406A queries the inner table T2 according to the received second block fetch retrieval request (e.g., second SQL sub-statement), and returns rows of matching data to the federated server 402 at step 1205 as the retrieval result. The sets of data received at step 1205 may be stored in the data block holding area 506 of the federated server 402. In implementations, the bulk join module 412 implements step 1205.

At step 1206, the federated server 402 launches/initiates the tuple producer 507 in accordance with predetermined rules to perform a partial join of data using a hash join method. In embodiments, when federated server 402 determines that a data size of T1 columns received at step 1202 is greater than a predetermined threshold value, the federated server 402 initiates the tuple producer 507 to build hash buckets for the buffered data (first set of data received at step 1205) in the data block holding area 506, using the join column (e.g., col1_1) as the key. The tuple producer 507 then probes each row in the first set of data to construct matched rows of data as a final result.

In embodiments, the federated server 402 utilizes the following hash join process steps: 1) build a hash bucket based on the key (the join column) of the block data buffered in the data holding block area 506, which is fetched from the first data source 406A; 2) probe each row retrieved from the second data source 406B, into the hash buckets to verify if any match exists; 3) if a match found, a valid final result row is produced; and 4) the process is repeat until the last row from second data source 406B is processed.

At step 1207, the federated server 402 returns the constructed matched rows of data to the client (e.g., client device 404) as a final result, in response to the block fetch retrieval request received at step 1201. In implementations, the bulk joining module 412 implements step 1207.

At step 1208, the federated server 402 may repeat steps 1201 through 1207 as necessary to retrieve all data requested in the client data request. The number of iterations may differ based on the block size array (e.g., how much data can be fetched at a time), and the amount of data to be retrieved.

Figure 13:
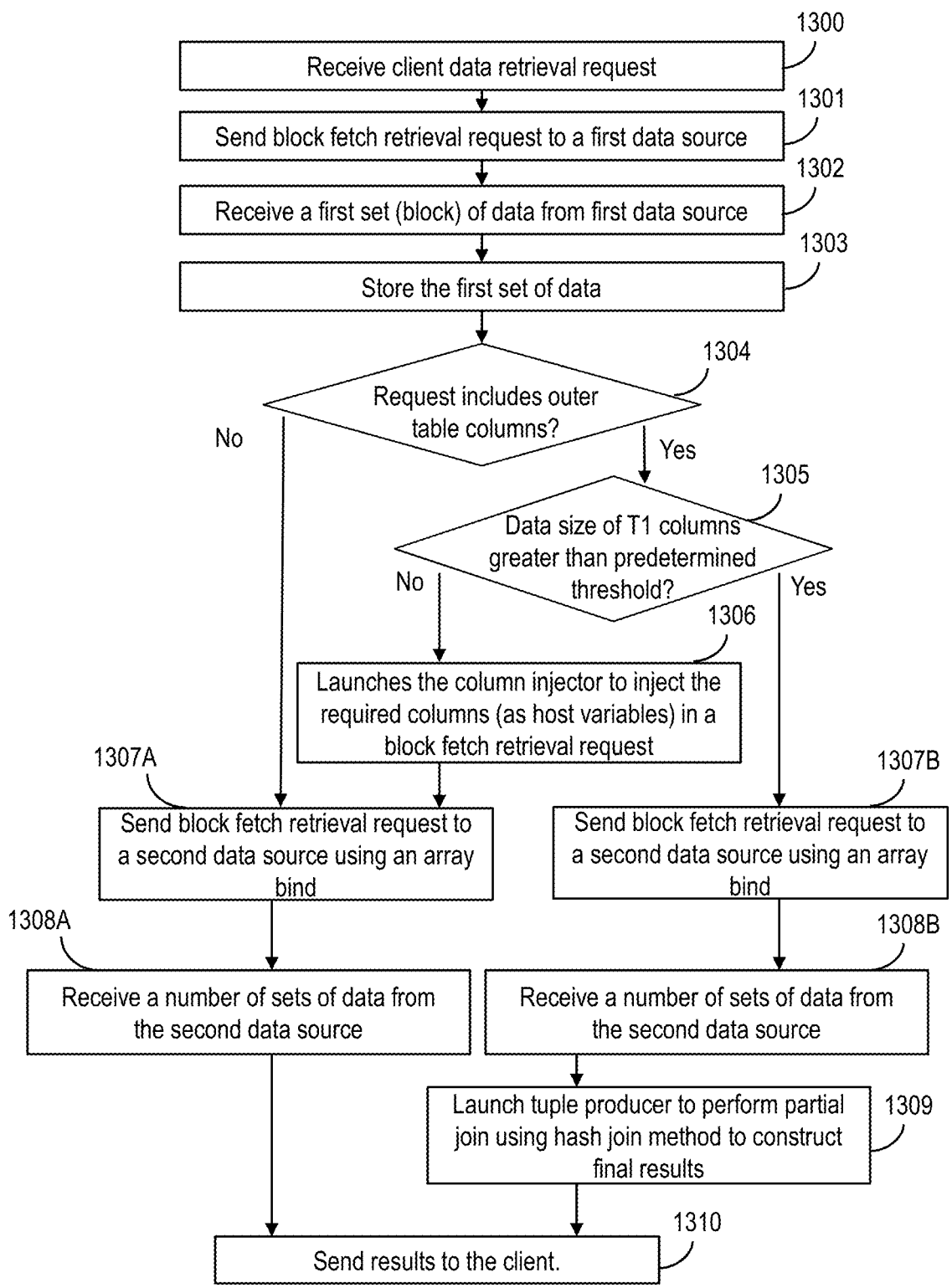
FIG. 13 shows a flowchart of methods in accordance with aspects of the invention.

FIG. 13 shows a flowchart of methods in accordance with aspects of the invention. The steps of FIG. 13 may be implemented by the federated server 402 of FIG. 4, and are described with reference to elements depicted in FIGS. 4 and 5. In embodiments, the federated server 402 is configured to perform the methods of FIGS. 10, 11 and 12, and steps of FIG. 13 may be implemented in accordance with steps of FIGS. 10, 11 and 12.

In implementations, at step 1300 the federated server 402 receives a client data retrieval request (e.g., join request) from the client device 404. Step 1300 may be implemented in accordance with step 1000 of FIG. 10, step 1100 of FIG. 11, and/or step 1200 of FIG. 12.

At step 1301 the federated server 402 sends a first block fetch retrieval request to the first data source 406A in response to the client data retrieval request received at step 1300. Step 1300 may be implemented in accordance with step 1001 of FIG. 10, step 1101 of FIG. 11, and/or step 1201 of FIG. 12.

At step 1302, the federated server 402 receives a first set (block) of data from the first data source 406A in response to the first block fetch retrieval request of step 1301. Step 1302 may be implemented in accordance with step 1002 of FIG. 10, step 1102 of FIG. 11, and/or step 1202 of FIG. 12.

At step 1303, the federated server 402 stores the first set of data in the data block holding area 506. Step 1303 may be implemented in accordance with step 1003 of FIG. 10, step 1103 of FIG. 11, and/or step 1203 of FIG. 12.

At step 1304, the federated server 402 determines if the client data retrieval request of step 1300 specified data to retrieve from an inner table (e.g., T2) only (not an outer table). See, for example, the statement in FIG. 10 "SELECT col2_2 FROM T1, T2 WHERE col1_1=col1_2," wherein col2_2 specifies column 2 of inner table T2. In implementations, the bulk joining module 412 of the federated server 402 implements step 1304.

At step 1307A, when the federated server 402 determines that the client data retrieval request of step 1300 specifies data to retrieve from an inner table (e.g., T2) only, the federated server 402 sends a second block fetch retrieval request to the second data source 406B using an array bind in accordance with step 1004 of FIG. 10.

At step 1308A, the federated server 402 receives a number of sets of data from the second data source 406B in accordance with step 1005 of FIG. 10, and at step 1310, the federated server 402 sends results to the client in accordance with step 1006 of FIG. 10. Steps may be repeated as necessary, set forth in step 1007 of FIG. 10, for example.

In contrast, if the federated server 402 determines at 1304 that the client data retrieval request of step 1300 specifies data to retrieve from both an inner table (e.g., T2) and an outer table (e.g., T1), then the federated server 402 determines at 1305 whether a data size of T1 columns received at step 1302 is less than or equal to a predetermined threshold value. In implementations, the bulk joining module 412 of the federated server 402 implements step 1305.

At step 1306, when the federated server 402 determines that the data size of T1 columns received at step 1302 is less than or equal to a predetermined threshold value at step 1305, the federated server 402 launches/initiates the column injector 508 to generate a modified second block fetch retrieval request in accordance with step 1104 of FIG. 11.

At step 1307A, the federated server 402 sends the second block fetch retrieval request (in the form of a modified second block fetch retrieval request) to the second data source 406B in accordance with step 1104 of FIG. 11, and progresses to steps 1308A and 1310 discussed above. Steps 1308a and 1310 may be implemented in accordance with steps 1105 and 1106 of FIG. 11. Additionally, steps may be repeated as necessary, set forth in step 1107 of FIG. 11, for example.

At step 1307B, when the federated server 402 has determined at step 1305 that the data size of T1 columns received at step 1302 is greater than the predetermined threshold value, the federated server 402 sends a second block fetch retrieval request to the second data source 406B using an array bind, in accordance with step 1204 of FIG. 12 for example.

At step 1308B, the federated server 402 receives a number of sets of data from the second data source 406B, in accordance with step 1205 of FIG. 12, for example.

At step 1309, the federated server 402 launches/initiates the tuple producer 507 in accordance with predetermined rules to perform a partial join of data using a hash join method in accordance with step 1206 of FIG. 12, then moves to step 1310, where results are sent to the client in accordance with step 1207 of FIG. 12. Steps may be repeated as necessary, set forth in step 1208 of FIG. 12, for example.

Based on the above, it can be understood that embodiments of the invention utilize a bulk NLJN method for joining data from remote tables from different heterogeneous distributed databases. In implementations, the bulk NLJN method leverages block fetch to faster access the outer table to feed data efficiently to access the inner table, and array bind to reduce the round-trip of data fetch request for the inner table. In embodiments, a tuple producer constructs the tuples of final match by partial hash joining the rows of the outer table and the inner table. In aspects of the invention, if the columns of the outer table are not that large (less than or equal to a threshold value), a column injector modifies the remote SQL to access an inner table by injecting columns in the select list of the SQL request. In implementations, the bulk NLJN method is applicable for federated/data virtualization systems or any other application/product that needs to join tables from different heterogeneous distributed databases.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
dividing, by a federated server, a data join request of a client into a first structured query language (SQL) sub-statement and a second SQL sub-statement;
sending, by the federated server, a first block fetch request comprising the first SQL sub-statement to a first data source based on the data join request of the client;
receiving, by the federated server, a first set of block data from the first data source, wherein the first set of block data comprises multiple rows of an outer table in the first data source;
modifying, by the federated server, the second SQL sub-statement to include host values of required columns as a bind array, thereby forming a modified second SQL sub-statement, in response to determining that a size of the columns in the first set of block data is less than or equal to a predetermined threshold value;
sending, by the federated server, a second block fetch request in the form of the modified second SQL sub-statement to a second data source based on the data join request;
receiving, by the federated server, a second set of block data from the second data source in response to the second block fetch request, the second set of block data comprising multiple rows of an inner table in the second data source that match the host values in the bind array; and sending, by the federated server, an output to the client in response to the data join request.

2. The method of claim 1, further comprising determining, by the federated server, whether the data join request specifies data to be retrieved from the inner table only, and not the outer table.

3. The method of claim 1, further comprising: upon determining that the size of columns in the first set of block data is less than or equal to the predetermined threshold value, initiating, by the federated server, a column injector of the federated server to inject the required columns as the host values in the second block fetch request, such that the second block fetch request is not solely based on the data join request.

4. The method of claim 1, further comprising:
sending, by the federated server, a third block fetch request to the first data source based on a new data join request of the client;
receiving, by the federated server, a third set of block data from the first data source in response to the third block fetch request, wherein the third set of block data comprises multiple rows of the outer table in the first data source;
sending, by the federated server, a fourth block fetch request to the second data source based on the new data join request, the fourth block fetch request including an array bind;
receiving, by the federated server, a fourth set of block data from the second data source in response to the fourth block fetch request; and
upon determining that the size of columns in the third set of block data is greater than the predetermined threshold value, initiating, by the federated server, a tuple producer to perform a partial hash join of the third set of block data and the fourth set of block data to produce a final output.

5. The method of claim 1, wherein the data join request is in the form of structured query language (SQL) request identifying columns in a table of the first data source and columns in a table of the second data source to be joined, and the modified second SQL sub-statement identifies the columns in the table of the second data source and values from the columns in the table of the first data source.

6. The method of claim 1, further comprising repeating the steps of: sending the first block fetch request; receiving the first set of block data from the first data source in response to the first data join request; sending the second block fetch request to the second data source; and receiving the second set of block data from the second data source, as needed to return all data requested in the data join request to the client.

7. The method of claim 1, further comprising saving, by the federated server, the first set of block data in a temporary storage buffer of the federated server to temporarily store the first set of block data during a join request process responsive to the data join request of the client.

8. The method of claim 1, wherein the federated server includes software provided as a service in a cloud environment.

9. A computer program product comprising one or more computer readable storage media having program instructions collectively stored on the one or more computer readable storage media, the program instructions executable to cause a federated server to:

receive a data join request from a client device, the data join request including data from an outer table in a first data source and data from an inner table in a second data source;
send a first block fetch request specifying a block size of data to the first data source based on the data join request;
receive a first set of block data from the first data source in response to the first block fetch request, wherein the first set of block data comprises multiple rows of the outer table in the first data source and is less than or equal to the block size specified in the first block fetch request;
generate a second block fetch request for the second data source based on the data joint request;
determine that a size of columns in the first set of block data is less than or equal to a predetermined threshold value;
modify the second block fetch request to include additional data in a form of host values of required columns as a bind array, thereby forming a modified second block fetch request, in response to determining that the size of the columns in the first set of block data is less than or equal to the predetermined threshold value;
send the modified second block fetch request to the second data source based on the data join request;
receive a second set of block data from the second data source in response to the modified second block fetch request, the second set of block data comprising multiple rows of the inner table in the second data source that match the host values in the bind array;
generate an output by combining the first set of block data and the second set of block data; and
send the output to the client device in response to the data join request in the form of rows from the outer table and the inner table.

10. The computer program product of claim 9, wherein the program instructions are further executable to cause the federated server to: determine whether the data join request specifies data to be retrieved from the inner table only, and not the outer table.

11. The computer program product of claim 9, wherein the program instructions are further executable to cause the federated server to: upon determining that the size of columns in the first set of block data is less than or equal to the predetermined threshold value, initiate a column injector of the federated server to inject the required columns as the host values in the second block fetch request to generate the modified second block fetch request, such that the modified second block fetch request is not solely based on the data join request, wherein the modified second block fetch request is a modified structured query language (SQL) block fetch request.

12. The computer program product of claim 9, wherein the program instructions are further executable to cause the federated server to:
send a third block fetch request to the first data source based on a new data join request of the client;
receive a third set of block data from the first data source in response to the third block fetch request, wherein the third set of block data comprises multiple rows of the outer table in the first data source;
send a fourth block fetch request to the second data source based on the new data join request, the fourth block fetch request including an array bind;
receive a fourth set of block data from the second data source in response to the fourth block fetch request; and upon determining that the size of columns in the third set of block data is greater than the predetermined threshold value, initiate a tuple producer to perform a partial hash join of the third set of block data and the fourth set of block data to produce a final output.

13. The computer program product of claim 9, wherein the data join request, the first block fetch request, and the second block request are in the form of structured query language (SQL) requests.

14. A system comprising:
a processor, a computer readable memory, one or more computer readable storage media, and program instructions collectively stored on the one or more computer readable storage media, the program instructions executable to cause a federated server to:
receive a data join request from a client device, the data join request including data from an outer table in a first data source and data from an inner table in a second data source, wherein the first data source and the second data source comprise heterogeneous distributed databases;
send a first block fetch request specifying a block size of data to the first data source based on the data join request;
receive a first set of block data from the first data source in response to the first block fetch request, wherein the first set of block data comprises multiple rows of the outer table in the first data source and is less than or equal to the block size of data specified in the first block fetch request;
save the first set of block data in a temporary storage buffer of the federated server;
generate a second block fetch request based on the data joint request;
determine that a size of columns in the first set of block data is less than or equal to a predetermined threshold value;
modify the second block fetch request to include additional data in a form of host values of required columns as a bind array, thereby forming a modified second block fetch request, in response to determining that the size of the columns in the first set of block data is less than or equal to the predetermined threshold value;
send the modified second block fetch request to the second data source based on the data join request;
receive a second set of block data from the second data source in response to the modified second block fetch request, the second set of block data comprising multiple rows of the inner table in the second data source that match the host values in the bind array;
generate an output by combining the first set of block data and the second set of block data; and
send the output to the client device in response to the data join request in the form of rows from the outer table and the inner table.

15. The system of claim 14, wherein the program instructions are further executable to cause the federated server to:
determine that the data join request specifies data to be retrieved from the inner table and an outer table.

16. The system of claim 15, wherein the program instructions are further executable to cause the federated server to:
initiate a column injector of the federated server to inject the required columns as the host values in the second block fetch request to generate the modified second block fetch request, such that the modified second block fetch request is not solely based on the data join request, wherein the modified second block fetch request is a modified structured query language (SQL) block fetch request.

17. The system of claim 15, wherein the program instructions are further executable to cause the federated server to:
send a third block fetch request to the first data source based on a new data join request of the client;
receive a third set of block data from the first data source in response to the third block fetch request, wherein the third set of block data comprises multiple rows of the outer table in the first data source;
send a fourth block fetch request to the second data source based on the new data join request, the fourth block fetch request including a bind array;
receive a fourth set of block data from the second data source in response to the fourth block fetch request;
determine that a size of columns in the third set of block data is greater than the predetermined threshold value; and
initiate a tuple producer to perform a partial hash join of the third set of block data and the fourth set of block data to produce a final output based on the determining that the size of the columns in the third set of block data is greater than the predetermined threshold value.

18. The system of claim 17, wherein the data join request, the first block fetch request, and the second block request are in the form of structured query language (SQL) requests.

* * * * *